May 21, 1929.  H. S. STINSON ET AL  1,713,787
CARBONATING APPARATUS
Filed Nov. 19, 1926   2 Sheets-Sheet 2
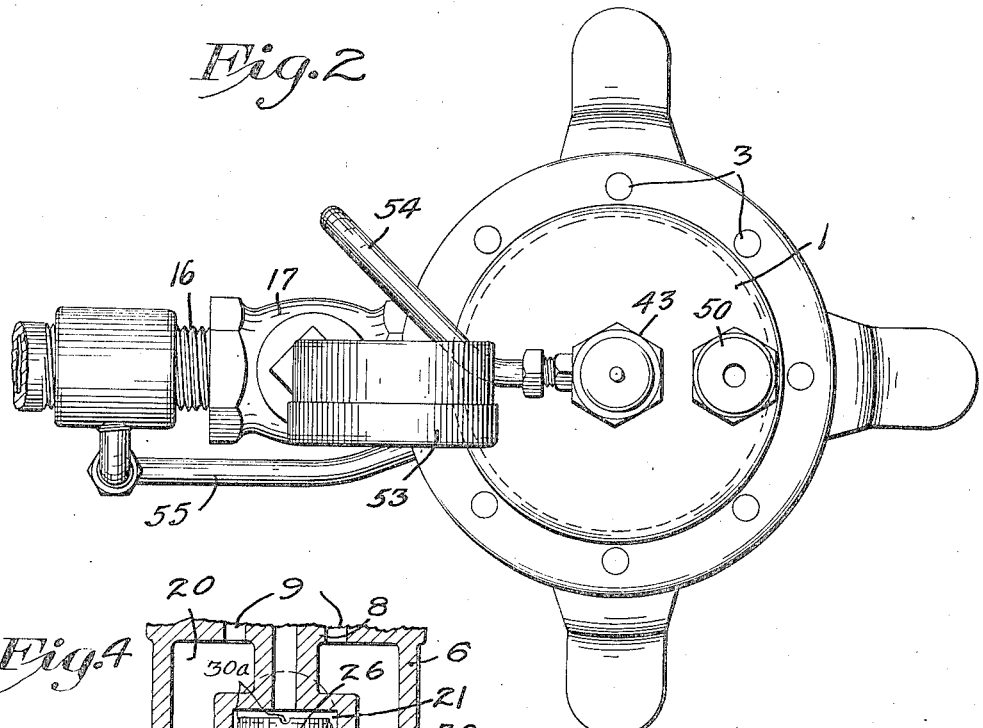
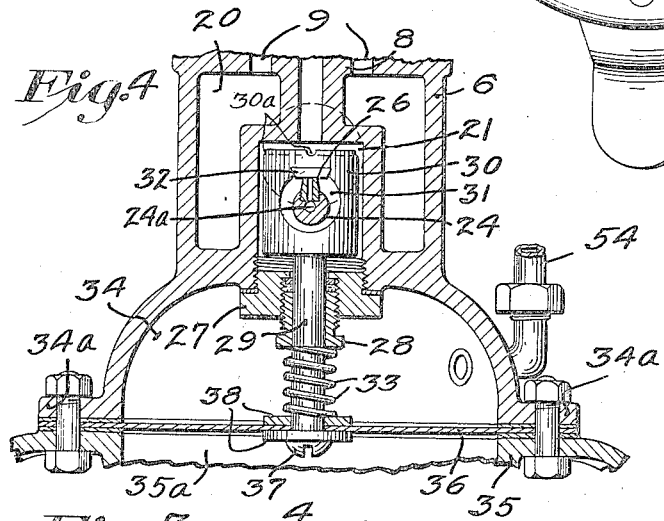
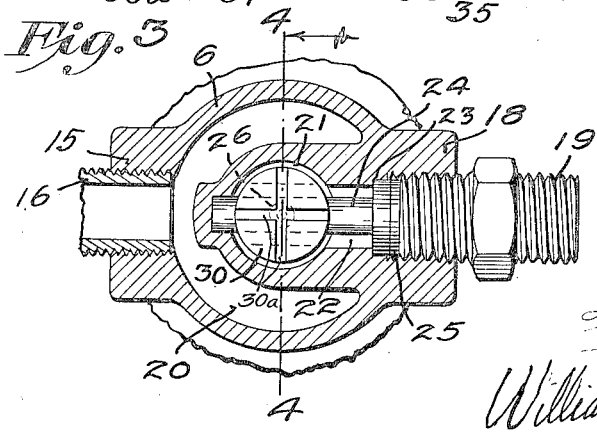

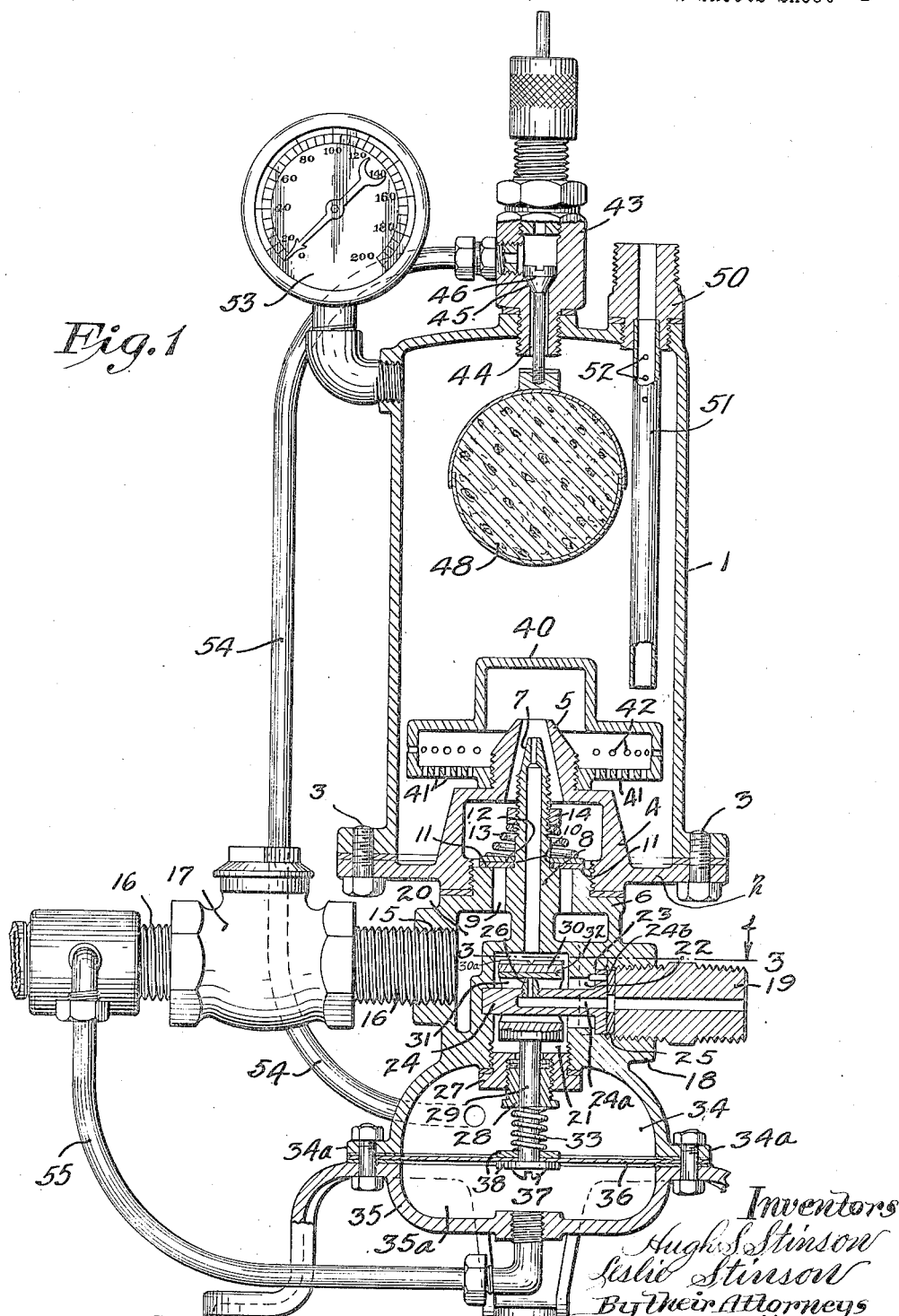

Patented May 21, 1929.

1,713,787

UNITED STATES PATENT OFFICE.

HUGH S. STINSON, OF GLENWOOD, MINNESOTA, AND LESLIE STINSON, OF GRAND FORKS, NORTH DAKOTA, ASSIGNORS TO THE STINSON CARBONATOR COMPANY, OF GRAND FORKS, NORTH DAKOTA.

CARBONATING APPARATUS.

Application filed November 19, 1926. Serial No. 149,373.

Our invention relates to self-contained automatic apparatus for impregnating water with gas, and more particularly for carbonating the water supplied to fountains and the like.

The present invention is an improvement on the invention disclosed in the applicant's, Hugh S. Stinson's Patent No. 1,500,283, issued July 8th, 1924, entitled "Carbonating apparatus." In said patent a successful apparatus was disclosed adapted to be connected with the water supply and with a drum containing gas, operative without the use of auxiliary pumps to supply the requisite quantity of gas to properly impregnate the water, the gas supply being automatically controlled by the withdrawal of the carbonated water from the apparatus, irrespective of any normal variations in the pressures of the water supply and the gas supply, thereby obviating the wastage of the gas.

Said original device of Hugh S. Stinson, while capable of functioning with a considerable degree of efficiency was not found entirely satisfactory in some respects. The means for admitting and controlling the constituents and especially the supply of gas to the mixing chamber became inefficient after continuous usage permitting some leakage of gas into the mixing chamber even though the pressure operated valve was closed.

In the original device the passage of gas into the mixing chamber was controlled by a disc valve adapted to close both an inlet and outlet port, said ports being disposed in close relation, wherein wear and chemical action caused a rut to be worn in the upper surface of the disc, connecting said ports and permitting leakage of gas, thereby lessening the efficiency of the device. Furthermore, the device was found to discharge a small amount of gas through the water supply pipe.

It is the main object of our invention to provide an improved carbonating apparatus overcoming the above stated objections to the original device of Hugh S. Stinson, provision being made for efficiently controlling the admission of the water and gas to the mixing chamber without leakage under continuous operation.

A further object is to provide an improved carbonating apparatus, including a new and improved pressure regulating valve controlling the supply of gas, means to prevent discharge of small amounts of gas through the water supply pipe, and improved means for controlling the admission of water into the mixing chamber.

These and other objects of the invention will be apparent from the following description made in connection with the accompanying drawings, wherein like characters refer to similar parts throughout the several views, and in which:

Fig. 1 is a vertical longitudinal section taken through a preferred embodiment of our invention;

Fig. 2 is a plan view of the device;

Fig. 3 is a cross section taken on the line 3—3 of Fig. 1; and

Fig. 4 is a vertical section of the lower portion of the device, showing the pressure controller, taken on the line 4—4 of Fig. 3.

Referring to the drawings in detail, we provide a cylindrical tank or receptacle 1 closed at its upper end and having a bottom closure 2 preferably secured to the body portion by means of a plurality of bolts 3, suitable packing being disposed between the opposed flanges. Preferably formed integral with said closure 2, and disposed centrally thereof, is a cylindrical chamber 4 terminating in a conical nozzle 5, screw threaded on its exterior, the lower portion of said chamber being provided with an enlarged central opening, a peripheral edge of which is screw threaded to receive the screw threaded extension of a hollow casting 6, suitable packing being provided between the under surface of the bottom closure 2 and an annular flange on casting 6. Casting 6 carries a centrally disposed upwardly projecting nozzle 7, the upper discharge end of which is concentric with the nozzle 5, said nozzle 7 having thereon an annular flange 8 spaced from the upper end of casting 6 to provide an annular slot 9 which constitutes a passageway between the interior of casting 6 and the interior of chamber 4. The upper surface of flange 8 and the upper end of casting 6 lie entirely in the same plane and provide seats 10 and 11 for a disc valve 12 pressed downwardly by coiled spring 13 to normally close passage 9. A pressure nut 14 having threaded engagement with the exterior of nozzle 7 engages the upper end of spring 13 and may be adjusted to vary the tension thereof.

One side of the casting 6, we provide with a connection 15 into which is tapped the pipe 16 communicating with the source of water supply and having therein an efficient check valve 17 adapted to prevent passage of gas backwardly through said water pipe. The opposite side of casting 6 is provided with a connection 18 into which is tapped the gas pipe 19 adapted to communicate with a drum or other supply of gas. The water supply is in direct communication with a passage 20 in the interior of casting 6, said passage 20 communicating at its upper end with passage 9. The gas supply is normally cut off from the interior of tank 1 by an improved form of pressure regulator, which will be more particularly explained hereafter.

Concentrically disposed within casting 6 adjacent the lower end thereof and below nozzle 7 is a cylindrical chamber 21 having a circumferentially disposed port 22 communicating with connection 18. An annular seat 23 is formed in the outer end of port 22 adapted to receive the flanged head of conduit 24 disposed radially with respect to chamber 21 and having its inner extremity seated in a recess formed in the side of chamber 21. Conduit 24 has a centrally disposed passage 24$^a$ extending from the flanged end thereof to a point slightly past the longitudinal center of passage 21. Conduit or union 19 is tapped into connection 18, clamping the flanged head of conduit 24 tightly against its seat 23, a suitable packing washer 25 being interposed between the inner end of conduit 19 and the outer end of conduit 24. A pin 24$^b$ is inserted through a horizontal port adjacent the edge of the flanged head of conduit 24, engaging a notch or recess in the seat 23 to prevent oscillation of conduit 24. A small nipple 26 is threadedly secured to the upper side of conduit 24 axially alined with chamber 21 and nozzle 7, and having a flat upper end extending preferably in a horizontal plane.

The lower end of chamber 21 is open and internally screw threaded to receive plug 27 carrying a gland 28, the latter having a vertical passage therethrough to receive the vertical stem 29 of the pressure regulating valve. Stem 29 at its upper end carries the valve 30 which is of general cylindrical shape having an enlarged radial aperture 31 therethrough of sufficient size to more than accommodate conduit 24 and its nipple 26. A flat plate 32 formed from non-corrosive material, is rigidly secured in horizontal position to the inner peripheral edge in position to normally be seated against the upper end of nipple 26, thus sealing nipple 26 and excluding the supply of gas. The upper end of valve 30 is provided with a pair of intersecting grooves 30$^a$ adapted to permit a passage of gas from valve chamber 21 to nozzle 7 when the valve 30 is projected against the upper end of chamber 21. Valve 30 is of somewhat smaller diameter than chamber 21, permitting the access of gas to the nozzle 7. The valve stem 29 is preferably surrounded by coiled spring 33, which normally seats the valve against the end of nipple 26 and which is interposed between gland 28 and a diaphragm secured to the lower end of valve stem 29.

The lower portion of the casting 6 forms a dome-shaped cavity 34 and is provided with an annular flange 34$^a$. The base or support for the apparatus 35 is secured to the lower annular flange 34$^a$ of casting 6 having a concave bottom 35$^a$ and between the meeting of the edges or flanges of members 34 and 35 is secured a suitable diaphram 36, the joint between said members being provided with suitable ring packings to render the same leak proof. The lower end of the valve stem 29 is secured to the center of diaphram 36 by any suitable means, such as the set screw 37 and washers 38.

Threadedly secured to nozzle 5 is a mixing chamber 40, which is preferably formed as a hollow casting having a relatively shallow disc-like body portion with an enlarged central dome substantially cylindrical in shape, the bottom of the body portion being provided with perforations 41 and the sides of the body portion being provided with perforations 42, said perforations establishing communication between the interior of the mixing chamber and the main tank 1. A hollow casting 43 having a passage 44 therein communicating with the interior of the main tank 1 and terminating at its top in a valve seat 45 is mounted centrally within the closed top of tank 1. A valve 46 engages seat 45, the stem of which valve is connected to a float 48 disposed within tank 1, which may be formed of cork engaged in a sheathing of non-corrosive metal. In the upper end of casting 43 a safety valve 49 is mounted of any appropriate form to prevent the accumulation of excess pressure in the apparatus. Mounted in the top of tank 1 is a coupling 50, to which is secured a dip pipe 51 extending vertically downwardly within tank 1 to a point adjacent the mixing chamber and provided near its upper end with a series of vent openings 52. The upper end of the coupling 50 is adapted to receive the discharge pipe of the apparatus leading to the soda fountain or other equipment to which the gas charged water is delivered.

A pressure gauge 53 is applied to the upper end of tank 1 serving at all times to indicate the pressure in the main chamber.

A relatively small pipe 54 connects with the interior of casting 43 at one end, and with the chamber 34 disposed above diaphragm 36 at its other end, and a pipe 55 of relatively small diameter connects at one end with the water supply on the outer side of check valve 17 and at the other end with the chamber 35ª disposed below diaphragm 36.

Operation.

In operation the water supply pipe 15 is connected to the city main or other source or supply of water under pressure and the gas supply pipe 19 is coupled with a gas drum or other source of gas supply by a suitable connection and pressure regulating means, the latter being so adjusted that the pressure of the gas supplied is considerably greater than the normal water pressure supplied by the pipe 15. The soda fountain or other apparatus is connected with the discharge pipe 51 at the coupling 50.

Assuming, for example, that the city water pressure is 62½ lbs. per square inch, and the gas pressure is 120 lbs. per square inch, if the spring pressed disc valve 12 requires a force of 2½ lbs. to raise the same for opening communication between the water supply and the main tank 1, the latter being full of water, the difference in pressure between the portion of the apparatus below valve 12 and the portion of the apparatus above said valve will be 2½ lbs., which difference will be maintained during the normal operation of the apparatus. The main water pressure of 62½ lbs. per square inch will be exerted on the under side of diaphragm 36 through conduit 55, while the pressure in the tank 1 will be transmitted, assuming float valve 46 to be held open, past said float valve, through pipe 54 into chamber 34 and against the upper side of diaphragm 36. The predominant pressure of 2½ lbs. per square inch between the water pressure and the pressure in tank 1, conditions being normal, tends to raise diaphragm 36 and unseat valve 30, which seals the end of nipple 26 controlling the gas supply, but the spring 33 normally seating valve 30 is sufficient to counterbalance this difference in pressure and retain the valve in engagement with nipple 26, thereby excluding the gas from nozzle 7. When the impregnated water from tank 1 is withdrawn, the pressure in said tank is, of course, immediately reduced usually from 2½ to 5 lbs. depending upon the diameter of the discharge opening in the faucet. Water, of course, is supplied to tank 1 as fast as the impregnated water is drawn out, the reduced pressure of tank 1 permitting the spring pressed valve 12 to be forced open by the predominant pressure from the water supply. The float 48 normally maintains the valve 46 in open position so that the reduction of the pressure in tank 1 is immediately communicated to the upper side of diaphragm 36 by pipe 54 and the predominant pressure from the water supply exerted on the under side of the diaphragm is sufficient to raise the diaphragm and with it the valve 30, thereby unsealing the gas supply nipple 26 and permitting the gas to pass through aperture 31, about the sides of the body of valve 30 through the constricted end of nozzle 7 and through the body of water passing through nozzle 5, the combined water and gas being violently agitated in the mixing chamber 40 and being thereafter discharged into the main tank 1 through perforations 41 and 42. This operation continues as long as charged water is being withdrawn from the main tank and the gas is thoroughly commingled with and absorbed by the water so that tank 1 is kept full of properly charged water. As soon as the draft apparatus is shut off the pressure in tank 1 immediately returns to normal, which, as has been indicated, is 60 lbs. This pressure is transmitted by pipe 54 to the upper side of diaphragm 36 again maintaining a difference in pressure between the upper and lower sides of the diaphragm of only 2½ lbs., which is insufficient to retain the valve 30 in open position against the tension of spring 33. Said valve is thus closed directly after the faucet or draft apparatus is turned off, thereby shutting off the supply of gas to the interior of the apparatus.

This operation is repeated each time the draft apparatus is opened to withdraw charged water, unless more gas is being delivered to the apparatus than it is possible for the water to absorb at the pressures employed, or unless the pressure of the water supply varies, under which conditions the apparatus acts as follows:

Assuming more gas is delivered than the water can absorb the surplus gas entering tank 1 accumulates at the top of the tank and causes the water level to be lowered, since the pressure exerted upon the valve 12 will be sufficient to prevent the lesser pressure of the water supply from unseating valve 12. When the water level falls to such a point that float 48 settles and closes valve 46, the next withdrawal of charged water reduces the pressure in the main chamber, but not in pipe 54, and, therefore, the pressure on the upper side of diaphragm 36 remains unchanged, so that gas discharge valve 30 is not unseated. No further quantity of gas is delivered to the apparatus until substantially enough dead water enters tank 1 to absorb the surplus gas, the reduction in the pressure of tank 1 through discharge of charged water permitting valve 12 to be unseated by the pressure of the dead water. Normal conditions are thus restored and the float 48 raised with the delivery of water to tank 1, re-establishing the connection between tank 1 and the upper side of diaphragm 36 by way of the pipe 54, which will permit diaphragm 36 to re-open valve 30. In the conditions above described where there is an excess of gas in tank 1 sufficient to lower the water level until one or more of the ports 52 in the discharge pipe 51 are uncovered, the water rushing through pipe 51 induces the gas at the top of the chamber which enters said pipe through the open holes effecting a satisfactory mixture of gas and water and releasing the gas cushion at the top of tank 1, thereby permitting the water level to rise and with it the float 48.

Should the water pressure supplied by pipe 15 increase above the normal, say to 67½ lbs. per square inch, it will be apparent that the normal differences in pressure on opposite sides of disc valve 12 will be maintained at 2½ lbs. which represents the force necessary to unseat the valve. Consequently, the same differences in pressure will be maintained on the upper and lower sides of diaphragm 36 of the pressure regulative valve, which will operate as before regardless of the position of valve 46, which establishes communication between the tank and upper side of the diaphragm, this being due to the fact that the increased water pressure is sufficient to depress the valve should it be closed, due to the lowering of the water level in tank 1.

If the water pressure should fall below normal, say to 57½ lbs. per square inch, the pressure on the under side of diaphragm 36 will be less than that on the upper side thereof, and valve 30 of the pressure regulator will be held more firmly against gas nipple 26. Upon the next withdrawal of charged water the pressure in tank 1 will be quickly lowered until it is again 2½ lbs. below that of the supply pressure, due to the action of valve 12 and the normal pressure differences between the upper and lower sides of valve 12 will be established and the apparatus will operate precisely as it would if the water pressure had remained normal, that is to say, a further reduction of the pressure by the discharge of water from the tank will be transmitted to the upper side of diaphragm 36 and cause the latter to unseat valve 30 to admit a proper supply of gas.

It will be seen, therefore, that the apparatus is entirely automatic and self-regulated, involves no auxiliary pumps or pressure producing devices to effect an exact mixture of the gas and water and can be regulated to supply just sufficient gas to properly charge the water without wastage of the gas. It will be seen further that if excess gas is supplied and the same will be ultimately admixed with the water supplied to the dispensing apparatus.

The pressure regulator mechanism working in co-operation with the other internal parts of the apparatus is positive and accurate in nature and will not be rendered inefficient by continuous usage. The gas conduit 24 is rigidly secured in operative horizontal position at one end by means of the seat 23 and to the opposite end by engagement with the recessed portion of the chamber 21. The vertically extending gas nipple 26 as well as conduit 24 extends through the aperture 31 of the valve 30 and the valve is tightly sealed when the non-corrosive flat plate 32 is moved against the end of nipple 26. Although nipple 26 and plate 32 become worn to some extent there will be no leakage or waste of gas into the interior of the apparatus, since the two parts will always engage to seal the outlet of nipple 26. The tension of spring 33 may be adjusted by means of the gland 28 to obtain the desired mixture of gas with the water and to compensate for wear when the same becomes necessary. In combination with the improved pressure regulator the casting 6 provides necessary chambers and passages for the accommodation of the interior working parts of the machine through which the gas is admitted, as well as provides the efficient valve seats for spring pressed disc valve 12 and the passage connecting the water connection 15 with chamber 4.

Disc valve 12 in connection with the seats afforded by the upper end of casting 6 and flange 10 of nozzle 7 provides a highly efficient water regulating valve, which may be adjusted by means of the nut 14.

The structure of the improved apparatus and relation of the several parts, including valve 30, nipple 26, tank 1, diaphragm 36 and conduit 54 provides automatic means for checking possible leakage through the pressure valve and for causing the pressure from any leakage of gas through plug 27 and packing gland 29 to be exerted on the upper side of diaphragm 36. Gas leakage between the end of nipple 26 and plate 32 will be transmitted to the upper side of diaphragm 36 through tank 1 and conduit 54, thereby automatically forcing valve 30 more tightly against the end of nipple 26. If any leakage of gas occurs through plug 27 or packing gland 29 the increased pressure is transmitted to the upper side of diaphragm 36, subjecting the diaphragm to the increased pressure and thereby keeping the apparatus in proper equilibrium. Furthermore, gas leaking through the packing gland and plug cannot be transmitted to the water supply and waste therethrough, since the chamber 34 above the diaphragm does not communicate with water conduit 16. These important results were not obtained by the original apparatus of Hugh S. Stinson.

It will, of course, be understood that various changes may be made in the form, details, proportions and arrangement of parts without departing from the scope of the invention.

What is claimed is:

1. Apparatus for impregnating liquid with gas, comprising a tank, a discharge connection therefor, a liquid supply connection, a valve chamber communicating with said tank, a gas supply connection including a conduit laterally disposed in said valve chamber, said conduit having a gas outlet therein, a valve having a head disposed between said gas outlet and the end of said chamber adjacent said tank, and having a stem slidable through the opposite end of said chamber, said head being adapted to close said gas outlet, a diaphragm connected with said valve to reciprocate the same, means for subjecting one side of said diaphragm to the pressure of said tank, and means for subjecting the opposite side of said diaphragm to the pressure of said liquid supply connection, whereby predetermined variations of pressure in the tank will control the operation of said valve and the supply of gas to said tank.

2. Apparatus for impregnating liquid with gas, comprising a tank, a discharge connection therefor, a liquid supply connection, a valve chamber communicating with said tank, a gas supply connection including a conduit laterally disposed in said valve chamber, said conduit having a laterally disposed gas outlet therein, a valve having a head disposed between said gas outlet and the outlet end of said chamber and having a stem slidable through the opposite end of said chamber, said head being adapted to close said gas outlet, a diaphragm connected with said valve to reciprocate the same, means for subjecting one side of said diaphragm to the pressure of said tank, and means for subjecting the opposite side of said diaphragm to the pressure of said liquid supply connection, whereby predetermined variations of pressure in the tank will control the operation of said valve and the supply of gas to the said tank.

3. Apparatus for impregnating liquid with gas, comprising a tank, a discharge connection therefor, a gas supply connection, a liquid supply connection, a check valve in said liquid supply connection for preventing the discharge of gas backwardly therethrough, a valve chamber communicating with said tank with which said liquid supply connection communicates, a valve controlling the flow of gas from said gas supply connection, a diaphragm connected with said valve to reciprocate the same, and disposed below the same, means for subjecting the upper side of said diaphragm to the pressure of said tank and means for subjecting the under side of said diaphragm to the pressure of said liquid supply connection, whereby predetermined variations of pressure in the tank will control the operation of said valve and the supply of gas to said tank.

In testimony whereof we affix our signatures.

HUGH S. STINSON.
LESLIE STINSON.